(12) United States Patent
Miyazaki

(10) Patent No.: US 6,854,927 B2
(45) Date of Patent: Feb. 15, 2005

(54) CONTAINMENT BOOM

(76) Inventor: Kunio Miyazaki, Kyoei Bldg. 4F, Higashi-Ikebukuro 3-2-4, Toshima-ku, Tokyo (JP)

(*) Notice: Subject to any disclaimer, the term of this patent is extended or adjusted under 35 U.S.C. 154(b) by 0 days.

(21) Appl. No.: 10/675,767

(22) Filed: Sep. 30, 2003

(65) Prior Publication Data

US 2004/0120770 A1 Jun. 24, 2004

(30) Foreign Application Priority Data

Dec. 20, 2002  (JP) ........................ 2002-369642

(51) Int. Cl.[7] .............................................. E02B 15/04
(52) U.S. Cl. ............................. 405/70; 405/63
(58) Field of Search .................... 405/60, 63, 66, 405/70, 71, 64, 65, 67, 68, 69, 72; 403/123, 221

(56) References Cited

U.S. PATENT DOCUMENTS

| | | | | |
|---|---|---|---|---|
| 3,906,732 A | * | 9/1975 | Tedeschi, Jr. ............... | 405/65 |
| 3,922,861 A | * | 12/1975 | Grihangne ................... | 405/64 |
| 3,958,521 A | * | 5/1976 | Memoli ........................ | 405/71 |
| 4,290,714 A | * | 9/1981 | Strange ........................ | 405/60 |
| 4,627,766 A | * | 12/1986 | Marquet ................... | 405/195.1 |
| 5,000,616 A | * | 3/1991 | Bell et al. ..................... | 405/66 |
| 5,407,301 A | * | 4/1995 | Lydiard et al. ............... | 405/66 |
| 5,509,756 A | * | 4/1996 | Chou et al. .................... | 405/70 |
| 2003/0185629 A1 | * | 10/2003 | Yodock et al. ............... | 405/63 |

FOREIGN PATENT DOCUMENTS

| | | |
|---|---|---|
| JP | Hei 10-18173 | 1/1989 |
| JP | Hei 11-43925 | 6/1989 |
| JP | Hei 11-100833 | 4/1994 |
| JP | Hei 9-151445 | 6/1997 |
| JP | 10-018273 | 1/1998 |
| JP | Hei 10-292357 | 11/1998 |

* cited by examiner

*Primary Examiner*—Sunil Singh
(74) *Attorney, Agent, or Firm*—Sampson & Associates

(57) ABSTRACT

In order to provide a containment boom capable of functioning as a barrier for certainly preventing the containment of oil spill in no concern to momentary violent movements of waves and currents, the containment boom comprises a plurality of float units and a coupling portion by which adjacent float units are coupled to one another. Each of the float units comprises a housing having an oil shielding surface perpendicular to sea level, a float portion having a buoyant force, and a plummet portion positioned under the float portion. In addition, the float portion and the plummet portion are adjusted so as to locate a water line to approximate middle position of vertical length of the oil shielding surface. Furthermore, the coupling portion is a flexible coupling portion for varying a relative position between the adjacent float units.

5 Claims, 5 Drawing Sheets

FIG.2
(A)
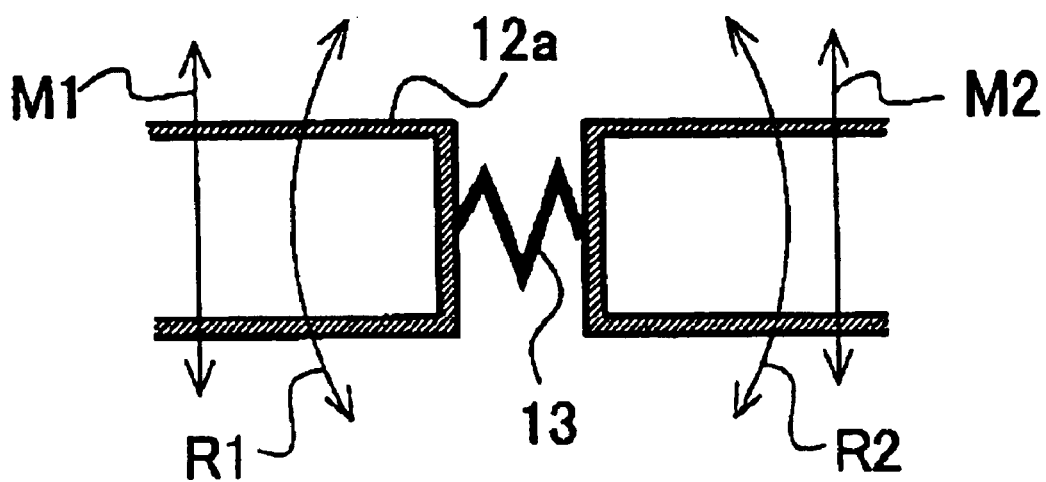
(B)
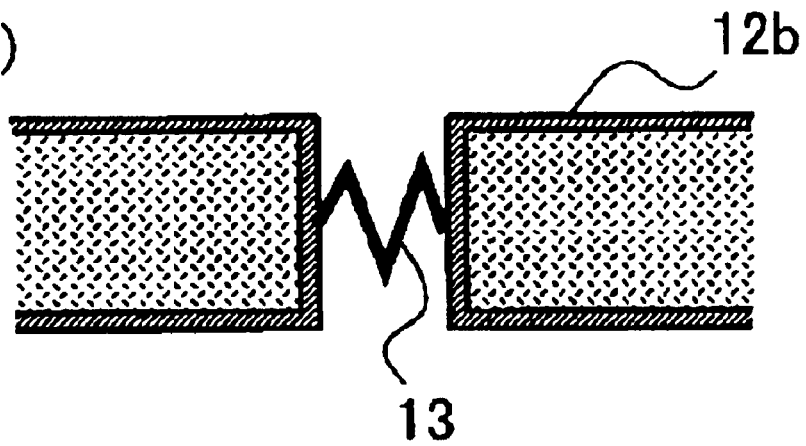

FIG.5
(A)
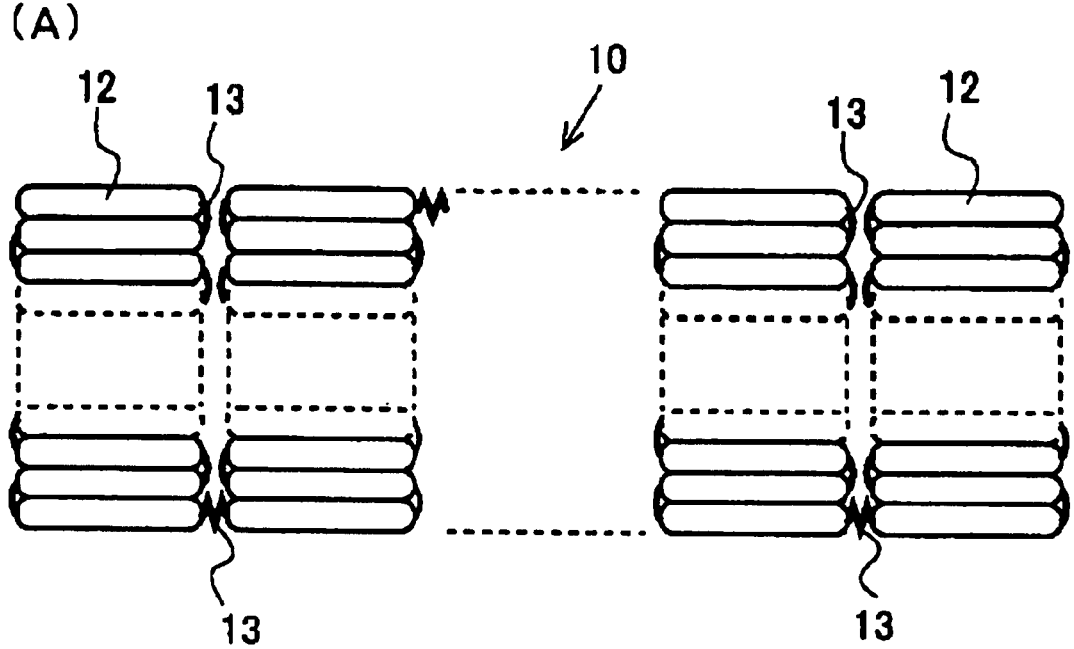
(B)
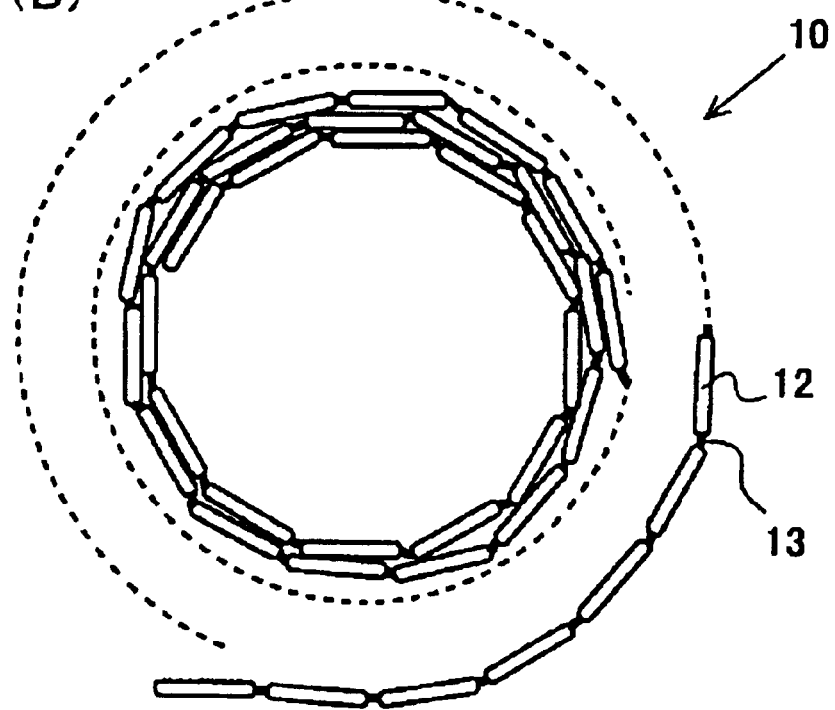

US 6,854,927 B2

CONTAINMENT BOOM

RELATED APPLICATIONS

This application claims the benefit of Japanese Application No. 2002-369642 filed on Dec. 20, 2002.

BACKGROUND OF THE INVENTION

The present invention relates to a containment or oil boom for preventing containment of oil which is spilled to sea.

When an oil spill accident occurs at sea, a containment boom is used to surround the oil spill, in order to prevent containment of the oil spill. Each of conventional containment booms has a structure in which a plurality of cylindrical floats are connected to one another, as disclosed in each of Patent literatures 1 to 5. In each of Patent literatures 1 to 5, a seat body or a bag body and a plummet body hang from each of the cylindrical floats into sea to prevent the oil from passing through the lower end of each float.

(Patent literature 1)

Japanese Patent Publication Tokkai Hei 11-100833

(Patent literature 2)

Japanese Patent Publication Tokkai Hei 11-43925

(Patent literature 3)

Japanese Patent Publication Tokkai Hei 10-292357

(Patent literature 4)

Japanese Patent Publication Tokkai Hei 10-18273

(Patent literature 5)

Japanese Patent Publication Tokkai Hei 9-151445

However, a gap often occurs between sea level and each of floats in each of conventional containment booms or waves get over the floats, inasmuch as it is difficult for the cylindrical floats to move in synchronization to movements of waves and currents. As a result, oil leaks out of the containment boom. In addition, the seat body becomes deformed or curls up on the basis of violent movements of waves and currents, inasmuch as the seat body is made of a flexible material, although the seat body hangs into sea and is vertically pulled down by the plummet body. As a result, oil leakage occurs in sea.

SUMMARY OF THE INVENTION

Taking the above-mentioned problems in to consideration, it is an object of the present invention to provide a containment boom capable of functioning as a barrier for certainly preventing the containment of oil spill in no concern to momentary violent movements of waves and currents. Furthermore, it is another object of the present invention to provide a containment boom capable of being retracted in compact and capable of being run at a high speed. It is further object of the present invention to provide a containment boom capable of being moved according to need after the containment boom is run on sea.

In order to accomplish the above-mentioned objects, the present invention provides the following structures.

(1) According to a first aspect of the present invention, there is provided a containment boom comprising a plurality of float units and a coupling portion by which adjacent float units are coupled to one another. Each of the float units comprises a housing having an oil shielding surface perpendicular to sea level, a float portion having a buoyant force, and a plummet portion positioned under the float portion. The float portion and the plummet portion are adjusted so as to locate a water line to approximate middle position of vertical length of the oil shielding surface. The coupling portion is a flexible coupling portion for varying a relative position between the adjacent float units.

(2) According to a second aspect of the present invention, the coupling portion comprises at least one fold portion extending upwardly and downwardly.

(3) According to a third aspect of the present invention, the coupling portion comprises a rail member.

(4) According to a fourth aspect of the present invention, the containment boom comprises a position stabilizing member for restoring variation of relative position between the adjacent float units in upward and downward directions.

(5) According to a fifth aspect of the present invention, the containment boom comprises a lower plummet part hanging from at least one float unit which is selected from the float units, an adjusting member for adjusting a hanging length of the lower plummet part, and means for remotely operating the adjusting member.

(6) According to a sixth aspect of the present invention, the containment boom comprises a sensor for detecting a relative position between the sea level and at least one float unit which is selected from the float units, and a screw operative of moving the float unit downwardly in accordance with a detection signal supplied from the sensor.

BRIEF DESCRIPTION OF THE DRAWINGS

FIG. 2(A) shows a sectional view along an X—X line of FIG. 1;

FIG. 2(B) shows a sectional view along a Y—Y line of FIG. 1;

FIG. 3(A) shows a front view of the containment boom; FIG. 3(B) shows a top view of the containment boom; and FIG. 3(C) shows a sectional view along a Z—Z line of FIG. 3(A);

FIG. 4(A) shows a front view; FIGS. 5(A) and (B) show views for describing a method of retracting the containment boom of the present invention.

PREFERRED EMBODIMENT OF THE INVENTION

Description will be made as regards a preferred embodiment according to the present invention, with reference to drawings.

Figure 1:
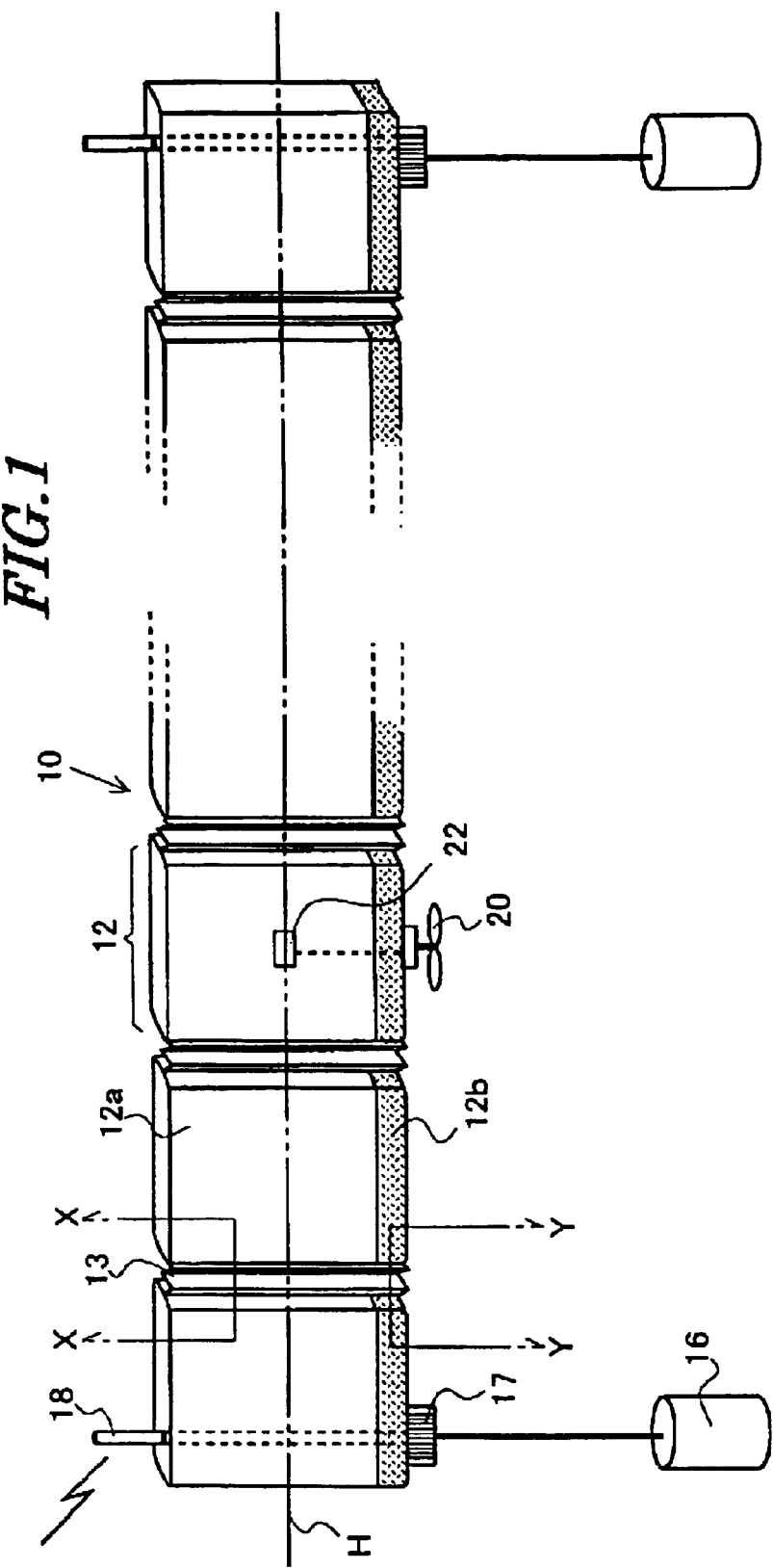
FIG. 1 shows an external prospective view for generally illustrating a containment boom according to a preferred embodiment of the present invention.

FIG. 1 shows an external prospective view for generally illustrating a containment boom 10 according to a preferred embodiment of the present invention. In FIG. 1, the containment boom 10 is developed on sea and is run on sea. A chain double-dashed line H represents a water line of the containment boom 10. The containment boom 10 of the present invention comprises a plurality of float units 12 each of which is coupled to an adjacent float unit 12 by a coupling portion 13.

In each of the float units 12, a main body of the float unit 12 comprises a housing composed of an oil shielding surface (a surface faced towards a front in FIG. 1), a float portion 12a having a buoyant force, and a plummet portion 12b positioned under the float portion 12a. Preferably, the housing is shaped into a flat box The float unit 12a may have a few tens of centimeters to two meters in a vertical length and may have one meter to ten meters in a width. The vertical length and the width are not limited in the above-mentioned ranges, respectively. The float unit 12a and the plummet portion 12b are adjusted so as to position an approximate middle position of a vertical length of the oil shielding surface to the water line H. In other words, a balance is appropriately adjusted between the buoyant force of the float unit 12a and the weight of the plummet portion 12b. Therefore, an upper half-portion of the float unit 12 is positioned above the sea level and a lower half-portion of the float unit 12 is positioned under the sea level. As a result, the oil shielding surface perpendicular to the sea level functions as a barrier which extends above and under the sea level to prevent the oil from passing under the sea level and to prevent the oil from getting over the float unit 12. It is possible for the float unit 12 to effetely synchronize with the heave of waves and currents. Even if a little delay occurs in the response of the float unit 12 under a hostile environment, there is not fear of oil leakage on the basis of an effect of the oil shielding surface having a large area. Under the circumstances, the float unit 12 is far superior to the conventional cylindrical float.

It is possible to adjust the position of the water line H by appropriately selecting the buoyant force of the float portion 12a and the weight of the plummet portion 12b.

The coupling portion 13 is a flexible coupling portion which is for varying a relative position between the adjacent float units 12. In the example being illustrated, the coupling portion 13 has at least one fold which is extends towards a vertical direction. Inasmuch as the coupling portion 13 has to function as a wall surface for shielding the oil, the coupling portion 13 is mounted over the entire vertical length of the float unit 12.

FIG. 2(A) shows a sectional view along an X—X line of FIG. 1. FIG. 2(B) shows a sectional view along a Y—Y line of FIG. 1. The sectional view along the X—X line represents a part dose to the coupling portion 13 between the adjacent units in the float portion 12a of the float unit 12, as shown in FIG. 2(A). The float portion 12a has a hollow space which is for adding the buoyant force, as shown in the figure. Alternatively, the float portion 12a is made of synthetic resin foam to have the buoyant force. The coupling portion 13 has an accordion-fold shape having at least one fold portion and has flexibility. By the coupling portion 13, the adjacent float units 12 can relatively rotate about axes each of which extends towards a vertical direction, as shown by arrows R1 and R2. In addition, the adjacent float units 12 can relatively move towards front and rear directions, as shown by arrows M1 and M2, respectively. Furthermore, description will be made with reference to FIG. 1. It is possible to the coupling portion to move as a folding fun motion in which the upper portion of the fold portion opens and the lower portion of the fold portion doses in the coupling portion 13. Alternatively, the upper portion of the fold portion may open and the lower portion of the fold portion may dose in the coupling portion 13. The sectional view along the Y—Y line represents a part dose to the coupling portion 13 between the adjacent units in the plummet portion 12b of the float unit 12, as shown in FIG. 2(B). In the example being illustrated, the plummet portion 12b has a hollow housing. A material having a great specific gravity is filled in the bottom portion of the hollow housing. In another example, the plummet portion 12b is jointed to the float portion 12a which is separately formed from the plummet portion 12b. The plummet portion 12b may be made of metal.

Each of the float unit and the coupling portion of the present invention is made of a material having endurance and strength with respect to a mechanical load such as bending, tensile, compression, and kink, taking use in sea into consideration. It is desired that the oil boom has a lightweight except the plummet portion 12b. For example, it is possible to use synthetic resin or metal in the float unit 12 and the coupling portion 13.

Again referring to FIG. 1, it is desired that at least one float unit 12 selected from a plurality of float units 12 has a lower plummet part 16 hanging from the float unit 12, an adjusting section 17 for adjusting the hanging length of the lower plummet part 16, and means 18 for remotely operating the adjusting section 17, in an embodiment of the present invention. The adjusting section 17 for adjusting the hanging length of the lower plummet part 16 may be, for example, a mechanism for running out and taking up a rope which is attached to the lower plummet part 16. In addition, the means 18 for remotely operating the adjusting section 17 may be, for example, an antenna for receiving a control signal which is for use in driving and stopping the adjusting section 17, in order to run out and take up the rope. On remotely operation, the control device positioned on a ship or a land transmits the control signal to the means 18. Under control of the lower plummet part 16, the lower plummet part 16 is run out so that the oil boom is fixed at a predetermined location. When the plummet part 16 is taken up according to need so that the oil boom is moved to another location.

Furthermore, it is desired that at least one float unit 12 selected from a plurality of float units 12 has a sensor 22 for detecting a relative position between the float unit 12 and the sea level and a screw 20 operative to moving the float unit 12 downwardly in accordance with a detection signal generated by the sensor 22, in another embodiment of the present invention. For example, the sensor 22 may be attached at a position of water line H which is initially established (or the sensor 22 may be attached at a position slightly below the water line H). When the float unit 12 floats from a normal position, the sensor 22 detects that the float unit 12 is perfectly exposed from the sea level. The sensor 22 transmits an abnormal signal to a driving device which drives the screw 20. Responsive to the abnormal signal, the driving device drives the screw 20. As a result, the float unit abnormally floated from the sea level is forcefully sunk to the normal position.

FIGS. 3(A) to (C) show views for illustrating another embodiment of a coupling portion 13 of oil boom 10 of the present invention. FIG. 3(A) shows a front view of the oil boom 10. The float unit 12 of FIG. 3(A) has a structure similar to that of the float unit illustrated in FIG. 1. The coupling portion 13 of FIG. 3(A) is different in structure from the coupling portion illustrated in FIG. 1. FIG. 3(B) shows a top view of the oil boom 10. The coupling portion 13 comprises a rail member. More particularly, the coupling portion 13 is formed by fitting a rail acceptance body 13a attached along a side surface of the float unit 12 to a rail acceptance body 13a attached another side surface of the float unit 12, between the adjacent float units. By the above-mentioned coupling portion 13, the adjacent float units 12 relatively rotate about axes each of which extends towards a vertical direction of each unit 12, as shown by arrows R1 and R2, respectively.

By the above-mentioned coupling portion 13, the adjacent float units 12 can relatively move upwardly and downwardly, as shown by arrows M3 and M4 of FIG. 3(A), respectively. Incidentally, the adjacent float units 12 are connected in their side surfaces by a position stabilizing member 15 which is formed by an elastic material, in order to prevent occurrence of excessive movements of the upward and downward directions that are shown by the arrows M3 and M4, respectively. The position stabilizing member 15 functions so as to restore variation of relative position between the adjacent float units 12 in the upward and downward directions. FIG. 3(C) shows a sectional view along the Z—Z line and shows an attaching example for the position stabilizing member 15. In the example being illustrated, vacant rooms 14 are formed near the central part of the side surface of the float unit 12. Both ends of the position stabilizing member 15 formed by the elastic material are fixed to the wall surfaces of the vacant rooms 14, respectively. In case of forming the vacant rooms 14 as shown in FIG. 3(C) and comparatively lengthening the position stabilizing member 15, it is possible to enlarge acceptable level of the relative positioning variation between the adjacent float units 12. A coil spring or a rubber may be used as the elastic material by which the position stabilizing member 15 is formed.

Figure 4:
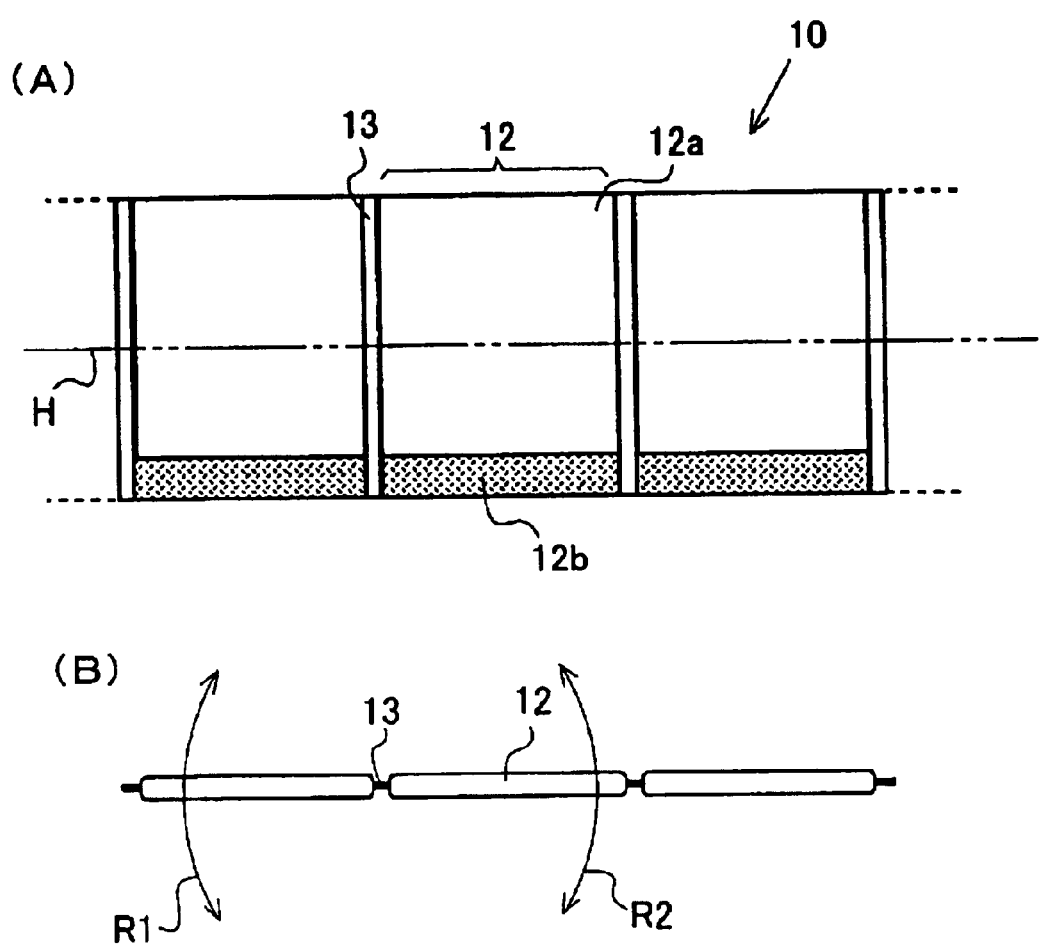
FIGS. 4(A) and (B) show views for illustrating another example of the containment boom.
FIG. 4(B) shows a top view.

FIGS. 4(A) and (B) show views for illustrating another example of the containment boom. FIG. 4(A) shows a front view. FIG. 4(B) shows a top view. The float unit 12 comprises the oil shielding surface, the float portion 12a and the plummet portion 12b as described in conjunction with FIG. 1. The float unit 12 of FIGS. 4(A) and (B) has a housing whose thickness is comparatively thinner than that of the housing illustrated in FIG. 1. In case of the thin housing, the adjacent float units 12 may be connected to one another by a single film material without the coupling portion 13 having the fold portion extending upwardly and downwardly. For example, a restriction part may be formed between the shapes of each float unit 12 in case of integrally molding a several continuous float units 12 in a manufacturing method. The restriction part may be used as the coupling portion 13. As shown in FIG. 4(B), the adjacent float units 12 can relatively rotate about the coupling portion 13 which is used as an axis, as shown by arrows R1 and R2, respectively.

Figure 3:
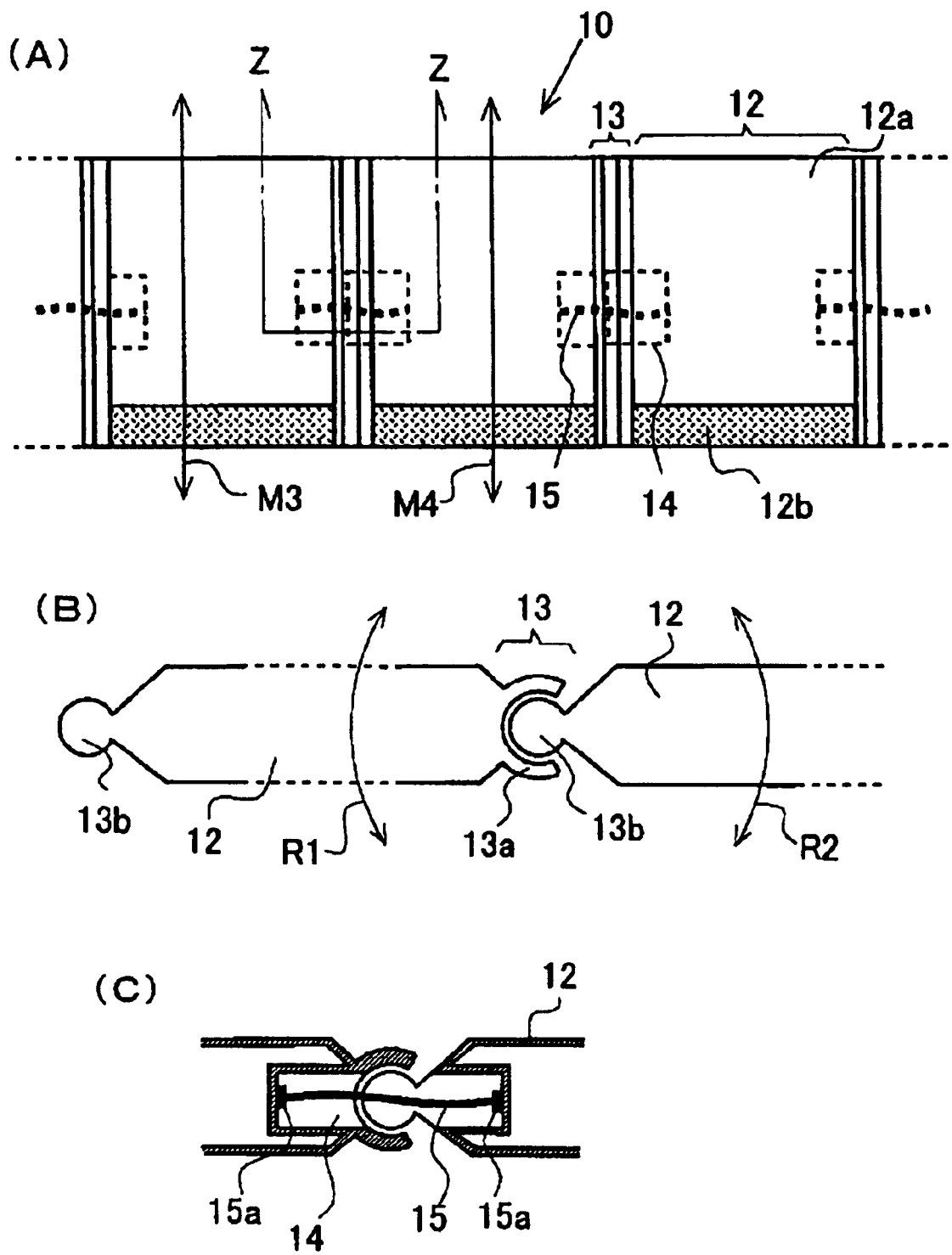
FIGS. 3(A) to (C) show views for illustrating an example of a coupling portion of the containment boom of the present invention.

FIGS. 5(A) and (B) show views for describing a method of retracting the containment boom 10 of the present invention. FIG. 5(A) shows a top face view for illustrating a state in which the containment boom 10 shown in FIG. 1 is folded by turns. FIG. 5(B) shows a top face view for illustrating a state in which the containment boom 10 shown in FIG. 3 is rolled in a spiral shape.

As described above, it is possible to retract the containment boom 10 with a stacked state and in compact in the present invention. Furthermore, it is possible to run the containment boom 10 on sea immediately, in case of developing the containment boom 10 on sea.

The containment boom of the present invention comprises a plurality of float units and a coupling portion by which adjacent float units are coupled to one another. Each of the float units comprises a housing having an oil shielding surface perpendicular to sea level, a float portion having a buoyant force, and a plummet portion positioned under the float portion. In addition, the float portion and the plummet portion are established so as to locate a water line to approximate middle position of vertical length of the oil shielding surface. Furthermore, the coupling portion is a flexible coupling portion for varying a relative position between the adjacent float units.

By the above-mentioned structure, it is possible for the oil shielding surface to function as a barrier for certainly preventing the containment of oil spill, inasmuch as the float unit synchronizes with momentary violent movements of waves and currents. Furthermore, it is possible for the containment boom to be retracted in compact and it is possible for the containment boom to be developed and to be run at a high speed. In addition, it is possible to prevent an oil leakage inasmuch as the sensor detects that the float unit abnormally floats, and the float unit is forcibly sunk to be returned back to a normal position in accordance with a detection signal generated by the sensor.

Moreover, it is possible to fix the containment boom by running out the lower plummet part under the remoter control and it is possible to move the containment boom according to need by taking up the lower plummet part under the remoter control, after the containment boom is developed and is run on the sea.

What is claimed is:

1. A containment boom comprising a plurality of float units and a coupling portion by which adjacent float units are coupled to one another wherein:

each of said float units comprises a housing having an oil shielding surface perpendicular to sea level, a float portion having a buoyant force, and a plummet portion positioned under said float portion;

said float portion and said plummet portion being adjusted so as to locate a water line to approximate middle position of vertical length of said oil shielding surface;

said coupling portion being a flexible coupling portion for varying a relative position between the adjacent float units;

wherein said coupling portion comprises a rail member: and said containment boom includes a position stabilizing member for permitting and limiting the relative position of the adjacent float units in upward and downward directions.

2. A containment boom as claimed in claim 1, wherein said containment boom comprises:

a lower plummet part hanging from at least one float unit which is selected from said float units;

an adjusting member for adjusting a hanging length of said lower plummet part; and means for remotely operating said adjusting member.

3. A containment boom as claimed in claim 1, wherein said containment boom comprises:

a sensor for detecting a relative position between the sea level and at least one float unit which is selected from said float units; and a screw operative of moving said float unit downwardly in accordance with a detection signal supplied from said sensor.

4. The containment boom of claim 1, wherein said position stabilizing member comprises elastic material.

5. The containment boom of claim 1, wherein said position stabilizing member is secured to wall surfaces of vacant rooms disposed within the adjacent float units.

* * * * *